March 16, 1926.

D. M. WEIGEL

PNEUMATIC TIRE FABRIC

Filed April 23, 1920

1,577,050

Inventor:
D M Weigel
By
Cooper Kerr & Dunham

Patented Mar. 16, 1926.

1,577,050

UNITED STATES PATENT OFFICE.

DANIEL MICHEL WEIGEL, OF LONDON, ENGLAND, ASSIGNOR, BY MESNE ASSIGNMENTS, TO AMERICAN WIRE CORD TIRE COMPANY, OF WILMINGTON, DELAWARE, A CORPORATION OF DELAWARE.

PNEUMATIC-TIRE FABRIC.

Application filed April 23, 1920. Serial No. 376,104.

*To all whom it may concern:*

Be it known that I, DANIEL MICHEL WEIGEL, a subject of Great Britain, residing at London, England, have invented new, useful, and novel Improvements in Pneumatic-Tire Fabrics, of which the following is the specification.

In the manufacture of casings and carcasses for pneumatic tires, a fabric of great tensile strength is required, one very flexible and one that will resist weather effects. The method now employed is to use canvas and like fabrics either woven or in single threads.

The great strain from road shock, rapid and continuous flexure, from the heavy load and high internal air pressure soon deteriorates such materials. Added to this is the liability to perish and rot, once moisture and dirt penetrates the outside cover of rubber.

Amongst other objects, I construct a fabric of very high tensile strength, one easily manufactured, one that will not readily perish. I also relieve fatigue upon the metal wires I employ.

Broadly stated, I construct a fabric of vulcanizable rubber and strands of wire. The wire is laid on the bias to the sheets of rubber. These wires are laid singly or may be wound backwards and forward, leaving a loop at each end where it turns back, or may be wound around a drum or made in any other way.

A space is left between each wire, rubber sheets already prepared for vulcanizing are laid on each side of the wires, and firmly pressed together, so that they meet in the spaces between the wires and fill such spaces. The rubber adheres together, forms a homogeneous whole and firmly locks the wires in place.

Any width or any angle may be employed and the sheets may be cut as desired to conform to the desires of the tire manufacturers.

The fabric may also be formed for each individual tire by building it up on a form or core. Such form would preferably be a similar section to the core upon which the casing would eventually be built up. Near the edge of such form may be a plurality of pegs set at the desired distance to each other. Backwards and forwards the wire would be wound, passing each peg preferably alternately, until the complete circumference would be covered with transversed wires running on a bias to the longitudinal axis of the form and with such spaces between the wires as may be desired and all wires running in the one direction.

Prior to the winding on the wires a sheet of vulcanizable rubber would be laid on the form and the wires wound over this rubber as described above. Another sheet of rubber, prepared for vulcanizing, is laid over the wires, and then firmly pressed on to the lower sheet of wire so that it adheres to it and fills the spaces as described.

The form which is preferably made in sections, is dismantled and the pegs, or some of them, removed and the fabric will be free to come off the form and ready for using by the tire manufacturer.

Another way of building it on the form is to wind on completely round the form and after the rubber is pressed into place, locking the wires, the wires may be cut on the inside of the form, thus separating them ready to twist the ends round the beads or bases of the tire.

I preferably use twisted wire strands or cords as it is much stronger and more flexible than solid wire and the curl in the twist permits of that necessary flexibility without straining the metal, necessary to relieve fatigue to the metal.

Figure 1:
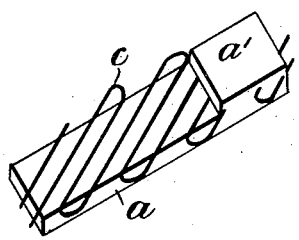
Figure 1, is an illustration of the wire on a bias to the vulcanizable rubber, wound back and forth with a loop at the turn.
Figure 2:
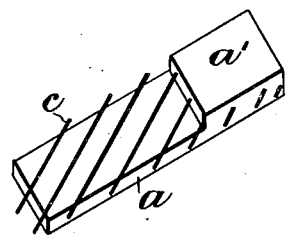
Figure 2, is an illustration of single strands laid on a bias to the rubber, each strand being separate.
Figure 3:
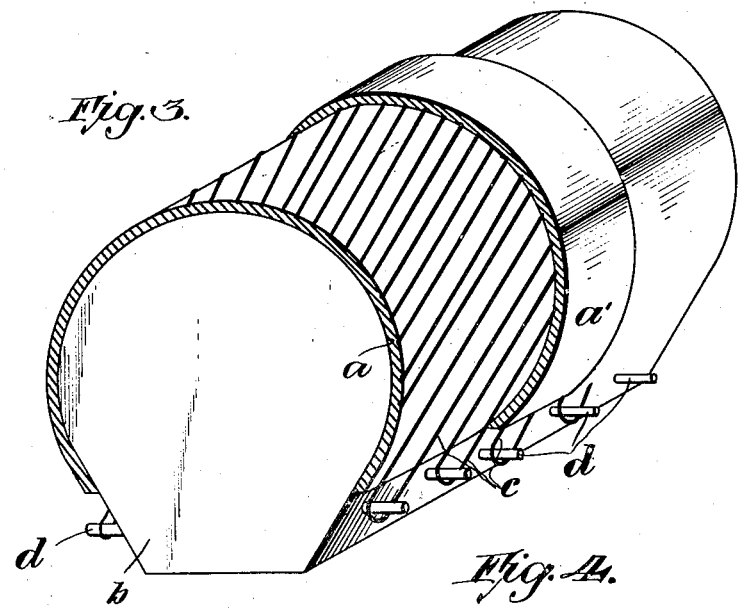

Figure 3 shows a method of building up the fabric on a form. "$a$" is the vulcanizable rubber laid on the form "$b$" and "$c$" are wires laid thereon and on a bias to the longitudinal axis of the form. The wire is wound round the peg "$d$". After this is complete, rubber, "$a^1$" is laid on and firmly pressed down as described.

This rubber metal fabric is thus ready to be used by the tire manufacturer in any way he may desire. He may use as much more rubber as he may desire, both interiorly or exteriorly. He may use several layers of my fabric and may use it so the wires cross each other, by laying the fabric to permit of this. He may employ vegetable fibre such as canvas in conjunction, if desired, but it is preferable to eliminate it.

Figure 4:
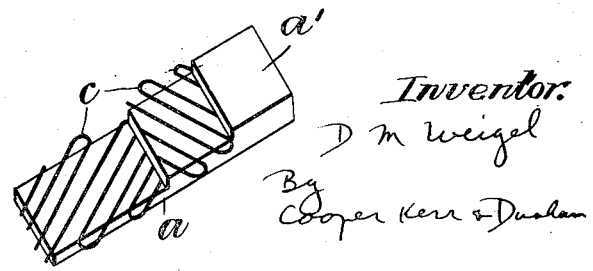

Figure 4, shows two layers of wires. One layer separated from the other by vulcanizable rubber and the wires running in opposite directions to each other. This may also be done on the form. If desired the whole of the wires may be made of an endless wire or they may be made in single wires.

Whichever way of manufacturing the fabric is adopted, the result is the same. Each wire or wire strand is separate and independent of the other. There is no weaving, the wires do not touch each other and therefore cannot chafe and cut each other. Each layer, whether wound endlessly or in single wires, consists of independent transversed wires which while separated from each other by the rubber are disposed sufficiently close together of themselves, together with the co-operating rubber, to resist air pressure which would react to tend to cause rupture of the fabric when in use.

My method not only allows of the use of strong wires, but greatly adds to the freedom of the wires to flexure. The wires not touching each other cannot chafe or cut and no heat of any consequence is generated. Any bias may be selected and any angle. In practice for tire construction, one layer of wire can be at any angle to another. Fabrics at all angles of wire can be used and combined in building up tires. The wires are laid sufficiently close to each other, so that if a second fabric is laid so that the wires cross those of the other, a small mesh is made, and sufficiently small to prevent the air pressure from within forcing the rubber through the mesh, by this means canvas and like fabric may be entirely eliminated.

I am aware that the vegetable cord fabric exists and that several devices of metal reinforcements have been used. My invention, however, is not like these. The difficulty has been to find a simple, form of wire and rubber fabric that will be easily handled, be strong and easily made.

Woven wire fabric does not readily adjust itself to the core and mould and has to be cut on the bias. Diagonally woven wire fabrics do not allow rubber between the warp and woof. My method keeps every wire strand separate. Wire fabrics are not very flexible and heavy wire of a close mesh cannot be employed. Any length fabric can be made of my simple form and cut as desired.

Heretofore in the specification and hereinafter in the claim I will refer to the term "wire" as designating a complete element. This wire may consist of a plurality of individual thin wires which twisted together constitute a strand and such strand will be referred to as a wire or a stranded wire.

I claim:

A fabric for pneumatic tire casings consisting solely of sheets of vulcanizable rubber, independent flexible metallic wire strands embedded in said rubber and each complete strand being separated from adjacent complete wire strands by the said rubber, the said wire strands being disposed sufficiently close together to so divide the rubber that the latter in conjunction with the said wire strands can together of themselves resist air pressure after the fabric sheet is formed into a casing.

In testimony whereof, I have signed this specification.

DANIEL MICHEL WEIGEL.